United States Patent Office 3,440,048
Patented Apr. 22, 1969

3,440,048

METHOD AND COMPOSITION FOR PRODUCTION OF COMBINATION LINE AND HALFTONE PHOTOENGRAVINGS

Walter S. Marx, Jr., Santa Barbara, Calif., assignor to Printing Arts Research Laboratories, Inc., Santa Barbara, Calif., a corporation of Delaware

No Drawing. Filed Oct. 12, 1964, Ser. No. 403,388
Int. Cl. G03c *5/04*
U.S. Cl. 96—41 12 Claims

ABSTRACT OF THE DISCLOSURE

A combination line and halftone reproduction of an illustration is prepared by first using a color-changeable material to prepare the tone areas of an illustration and conventional materials for the lines. A halftone reproduction of the illustration is first prepared, then the illustration is contacted with a material which will change the color of the color-changeable material to a new color and then a line negative of the illustration is photographically produced with light having the same spectral characteristics as the new color.

This invention relates to the graphic arts and has particular reference to a method and composition for use in the production of combination line and halftone photoengravings.

The method of this invention is particularly applicable to the production of coarse-screen photoengravings for newspaper advertising. The relatively poor grade of paper on which newspapers are printed requires the use of halftone screens no finer than about 85 lines per inch, most newspapers using screens of 65 lines per inch to assure trouble-free printing. Halftone reproductions, made with 65-line screens, are generally satisfactory for areas of the various grays in an illustration, but black lines and type characters reproduce with visually disagreeable "saw tooth" edges, or as a series of separate dots, rather than as continuous lines. Since most illustrations rely on pen lines or brush lines for detail, many attempts have been made to print such linework, without a screen in combination with screened tone areas, so as to produce a so-called combination line and halftone reproduction.

Among the methods heretofore used for the production of combination line and halftone printing plates, nearly all required expensive and time-consuming handwork to produce the required composite of line and screened images. Four of those handwork methods are described in columns 1 and 2 of my U.S. Patent No. 2,687,949, issued Aug. 31, 1954. A fifth and improved semiautomatic method is the subject of that patent. It describes an automatically-made overlay mask wherein the nonactinic mask color is discharged by a reactive material contained in wash tones of the original art to be printed, the discharge being activated by moisture and the use of apparatus to maintain contact between the mask and the subject while reactive material transfers from the subject art to the mask. The mask is then superimposed over the art to prevent photography of line areas while the halftone exposure is made. Such a mask may also be made by using heat and moisture, instead of moisture alone, to transfer reactive material from art to mask. The heating method is the subject of my U.S. Patent No. 2,770,534, issued Nov. 13, 1956.

While the methods of my aforesaid patent eliminated the costly handwork of the prior art methods, they did not produce unscreened lines through screened halftone areas. Accordingly, it is still conventional practice to separately print a highlight halftone negative and to prepare a hand-worked line negative, the two negatives then being successively printed in register to produce the combination line and halftone result. The line negative as photographically produced is not fully opaque in the tone or wash areas of the original drawing, i.e., where drak gray or middle gray occurs in the drawing. Those areas of the negative, being only partly opaque or nearly transparent, would print-through when the negative is double-printed, and would veil or solidly plug corresponding areas of the resulting positive. Therefore, such line negatives are hand-worked to make the mopaque in all areas except those which correspond to black lines or other black areas of the original drawing. Such a negative double-prints successfully, but requires excessive time and careful work for hand-painting along sides of lines, lettering, etc. Intricate subjects often require several hours of hand-opaquing and the results are often substandard in quality because of human fallibility.

Accordingly, a primary object of the present invention is to provide a novel method for producing combination line and halftone negatives and/or printing plates, which method is not subject to the above and other disadvantages of the prior art.

A further object of the present invention is to provide a method which eliminates all handwork, avoids all need for overlay masks and also avoids the need for including unstable reactive substances in the paint material.

A further object of the present invention is to provide a method for the production of combination line and halftone printing plates, utilizing conventional procedures for the production of the highlight halftone negative and utilizing conventional photographic apparatus for the production of the line negative and the double-printing of the two negatives, but substituting a simple, inexpensive and virtually error-proof procedure for the prior art method of taking out the tone areas of the artwork in the production of the line negative.

A further object of the present invention is to provide novel compositions for use in the production of combination line and halftone printing plates.

Heretofore, the linework of combination line and halftone reproductions was continuous (unscreened) only where the lines occurred over pure (unscreened) white areas. No method was known that could produce unscreened lines through screened halftone values, aside from the extremely laborious and time-consuming hand-opaquing of line negatives, hand-painting with an acid-resist on the metal plate, or hand-tracing of such lines on a screened positive print.

Accordingly, another object of the present invention is to provide a process of the type wherein a line negative is separately photomechanically printed over a highlight halftone negative in register therewith, the resulting composite being a true (total) combination of unscreened line reproduction in all black portions of the original subject and screened halftone reproduction in the gray or tone portions of the original subject.

Other objects and advantages of this invention it is believed will be readily apparent from the following detailed description of preferred embodiments thereof.

Briefly, the process of the present invention comprehends within its scope the discovery of novel paint compositions for use by the artist in place of the conventional watercolor blacks or inks which are thinned to produce the various shades of gray comprising the tone areas of the artwork to be reproduced, and which tone areas are ultimately to be produced with the halftone screen pattern. In accordance with the process of the present invention, the illustration or other artwork to be reproduced is prepared by the artist in the normal manner to include both the tone or wash areas ultimately to be produced with the halftone screen pattern and the so-called "line" portions which are ultimately to be reproduced unbroken by screen pattern, these line portions being rendered with conventional inks or pigments in pen lines, pencil lines, type proofs and the like. The essential distinction resides in the composition of the medium used by the artist in rendering the tone or wash areas, such composition including color-changeable ingredients adapted to provide the desired tone areas as initially applied by the artist, for the production of a highlight halftone negative in the conventional manner, but capable of substantial change in spectral characteristics by a simple treatment without materially affecting the quality of the line portions, such as by spraying a solution onto the surface of the artwork, for subsequent production of a line negative by photographing the color-changed artwork with light having spectral characteristics substantially the same as those to which the tone areas are changed. The resulting line negative is in condition for double-printing with the halftone negative without further treatment. Most advantageously, the method is carried out with the use of a novel gray watercolor composition capable when initially applied of producing tone or wash areas of varying shades of gray substantially duplicating those obtained with conventional artists' media, the ingredients thereof being color-changeable to a yellow color or other lightened color which readily photographs as "white" when exposed to yellow light or light of such other corresponding lightened color, the color changing characteristics of the ingredients being reversible so that after production of the two negatives the artwork can be restored to its original state.

The following specific examples illustrate the methods and composition of the present invention, but it is to be understood that the invention is not to be limited to the specific details thereof:

EXAMPLE I

A drawing is made utilizing conventional black ink or pigment for the linework and the following composiiton for the gray tone or wash areas:

| | Parts by wt. |
|---|---|
| Water | 100.00 |
| 4,4'-diamino-2,2'-disulfostilbene | 2.00 |
| Dibasic sodium phosphate | 1.00 |
| Bromphenol blue | 0.35 |
| Eosin B | 0.29 |
| Paper Yellow L | 0.54 |

In the foregoing formula, the stilbene derivative is the absorber of ultraviolet light, included for use in producing the highlight halftone negative by the "Fluorographic" process as disclosed in my U.S. Patent No. 2,191,939. Other ultraviolet absorbers may, of course, be substituted, provided they are sufficiently absorptive of light in the wave-length range between about 340 and 410 millimicrons, are compatible with the color-changeable components, are adequately soluble in water, and allow adjustment of the solution pH to maintain the color-changing components in the desired color condition for application to a drawing. In addition to the stilbene derivative, other such ultraviolet absorbers include benzophenone derivatives such as 2-hydroxy-4-methoxybenzophenone-5-sulfonic acid and sodium 2,2'-dihydroxy-4,4'-dimethoxy-5-sulfobenzophenone; coumarine derivatives such as beta methyl umbelliferone and 4-methyl-7-diethyl-aminocoumarin; nitrogen compounds such as paranitrophenol and 3,5-dinitrosalicylic acid. The ultraviolet absorber must be used in sufficient quantity so that when the solution is painted out and dried it absorbs a substantially greater proportion of the ultraviolet light in the 340 to 410 millimicron wave-length range than is reflected, providing a paint which is effectively nonactinic when photographed under exposure to light filtered to wave-lengths primarily within that range.

Dibasic sodium phosphate is used in the foregoing composition to bring the pH of the solution to about 9.5. Also, its buffering action at pH 9.5 is useful in maintaining alkalinity in washes when the solution is painted out on art papers and boards which may be slightly acidic. However, any water soluble base may be used for this purpose regardless of its buffering ability so long as it has no harmful effect on other ingredients or on subsequent bleaching. For example, morpholine or sodium acetate are also suitable alkalizing agents, and can be used in the same concentration as the dibasic sodium phosphate.

Bromphenol blue (National Analine Division, Allied Chemical Corporation, New York; Catalog No. 332) and Eosin B (Color Index Acid Red 91, Matheson Coleman & Bell, Cincinnati), are indicators commonly used for pH determinations. The former is blue in its basic condition, and the latter is red. Both change to yellow at pH 2.0 and below.

Paper Yellow L (Color Index Acid Yellow 1, Du Pont, Wilmington, Del.), is one of a number of yellow dyes suitable for use in this composition. Its primary function is to provide the tristimulus coloring to produce a visually neutral gray with the blue and red indicators. The yellow dye need not be a color-changing compound because the blue and red indicators become yellow when acidified, and the additional yellow color of a permanent yellow has no material effect upon the photomechanical steps which follow. The yellow dye used, however, should be one that is not substantially changed by either the acid or basic spray solutions which are applied to convert the indicator colors as described below. Other examples of yellow dyes which may be used are Amacid Yellow S (made by American Aniline Products, Inc., of Chicago, and identified as Color Index Acid Yellow 1) and Quinoline Yellow (made by Du Pont, Wilmington, Del., and identified as Color Index Acid Yellow 3).

Compositions in accordance with the invention may also contain the usual preservatives, suspending agents, flow-promoting and other additives which are well known in the production of artists' materials.

The color-changeable watercolor, made according to the foregoing formulation, when normally painted out on artists' illustration board or papers, will produce, upon drying, a nearly gray, relatively dark wash which is photometrically about 80% black. To produce lighter tones, the artist dilutes this color as desired with a nearly colorless solution containing one or more absorbers of ultraviolet light. Such a solution may be comprised of 2% 4,4'-diamino-2,2'-disulfostilbene, in water, or any of the aforementioned ultraviolet light absorbing materials used in concentrations to produce the desired ultraviolet absorbing characteristics as set forth above. Although not essential, it is desirable for the sake of permanence in the artist's drawing, that the ultraviolet absorbing diluting solution be alkalized with dibasic sodium phosphate (preferably 1% by weight), or a similar alkali, to maintain the diluted blue and red pH indicators at the original chromatic hues. Otherwise, those indicators may be partly converted by acidic illustration boards and papers.

Continuing with Example I, when the drawing, made as described, is ready for photomechanical processing for the ultimate production of a printing plate, a highlight halftone negative is made. The highlight halftone negative, required for double-printing with the line negative made as described below, is preferably made prior to the step of changing the color of the drawing tone areas. This halftone negative is made in the conventional manner, through a halftone screen, and is highlighted (made opaque in areas corresponding to white portions of the original art) by means of an unscreened exposure using ultraviolet light only, in accordance with said "Fluorographic" process. All work areas of the original art are strongly absorptive of ultraviolet light while the nonwork white areas reflect ultraviolet light so as to expose and obliterate screen pattern in corresponding areas of the negative. The negative is developed as usual.

The drawing is then removed from the camera and sprayed with an acidic spray solution to convert the blue and red indicators to yellow. A suitable acidic spray formula is as follows:

| | Parts by vol. |
|---|---|
| Water | 45 |
| Hydrochloric acid (concentrated, 38% HCl) | 4 |
| Isopropanol | 6 |
| Methyl ethyl ketone | 45 |

This composition provides acid and water to convert the indicators. Methyl ethyl ketone, as a poor solvent for the indicators, depresses undesirable spotting or feathering of the convertible wash tones, and also reduces surface-tension of the mixture so that the spray approaches a fog-like consistency. Isopropanol acts as a mutual solvent to provide miscibility of the methyl ethyl ketone with water, so that the mixture is homogeneous.

Application of the acidic spray to the convertible wash tones throughout the drawing promptly converts those tones to yellow. This spray has no effect upon pen lines rendered with conventional black drawing inks, pencil lines, black brush-work rendered with conventional black drawing inks, or type proofs printed with the usual black printing inks. The so-converted drawing is then photographed without a screen, and through a yellow filter, such as a standard Wratten No. 15–G made by Eastman Kodak Company, of Rochester, N.Y. Upon normal development, the resulting line negative is opaque in all areas except those corresponding to black portions of the original subject.

This line negative is then individually printed, in register with the original highlight halftone negative, upon a metal plate in the conventional manner and the plate is subsequently etched to produce a photoengraving. Alternatively, and at the user's preference, the two negatives may be individually printed in register upon a sheet of conventional photomechanical film to produce a positive image, or upon so-called "direct positive" or "duplicating" photomechanical films to produce a negative, as will be well understood by those skilled in the art.

It is usually desirable to restore the original neutral, or near-neutral, color of the original rendering. This may be done after evaporation or dissipation of the major portion of the acid applied by the bleaching spray. A suitable restoring spray is formulated as follows:

| | Parts by vol. |
|---|---|
| Water | 44 |
| Morpholine | 7 |
| Isopropanol | 4 |
| Methyl ethyl ketone | 45 |

The morpholine in this composition provides the base or alkali which, in the presence of water, chemically neutralizes any acid remaining on the drawing, and reconverts the indicators approximately or exactly to their original colors. The methyl ethyl ketone and isopropanol perform the same functions as in the aforementioned acidic spray.

In both spray solutions, the use of volatile acids and bases is preferred. In the bleaching spray, hydrochloric acid will volatilize from the sprayed artwork within a few minutes, leaving only small quantities entrapped in the paper fibers and surface-coating materials, although the acidified indicators retain their converted colors for several hours. The small amount of residual hydrochloric acid is readily neutralized by a sufficiently alkaline restoring spray. A volatile base, such as morpholine, in the restoring spray behaves similarly but the realkalized color washes retain their restored color indefinitely provided that the pH indicators used in those washes are not affected by atmospheric carbon dioxide which is slightly acidic. Volatile morpholine, used in the restoring spray, leaves the restored art within a few minutes' time so that the bleaching and restoring cycle may be repeated if necessary.

To illustrate the effect of atmospheric carbon dioxide on pH indicators used for the method of this invention, a good example is the common pH indicator ortho cresol phthalein. This compound is colorless at pH 8.2 and below, and red-purple above pH 9.0. A solution of orthocresol phthalein at pH 12.0, for example, could be used to produce a strongly purple convertible wash in accordance with the invention. However, such a compound would not be suitable for general commercial purposes since after exposure to normally humid air for a few hours, the purple color would begin to disappear and ultimately the wash would become practically colorless because of its reaction with atmospheric carbon dioxide of which the pH is between 5.0 and 6.0.

In place of the acidic spray solution of Example I, other acids such as lactic acid, phosphoric acid, citric acid and the like may be used, the concentrations and strengths of the acids being sufficiently low to prevent damage to the paper or board containing the artwork but sufficiently high to bring about the necessary color change. The same considerations apply to the base in the restoring spray. Bases or alkaline materials which may be substituted for the morpholine spray of Example I include potassium hydroxide, ammonia, monoisopropanolamine, etc.

EXAMPLE II

A further example of a watercolor composition useful in producing the gray tone areas in the process of Example I is as follows:

| | Parts by wt. |
|---|---|
| Water | 100.00 |
| 4,4′-diamino-2,2′-disulfostilbene | 2.00 |
| Trisodium phosphate | 2.00 |
| Bromcresol purple (Coleman & Bell Co., Norwood, Ohio) | 0.34 |
| Bromchlorphenol red, WS Hartman-Leddon Co., Philadelphia) | 0.15 |
| Paper Yellow L | 0.56 |

This composition is diluted in the same manner as indicated in Example I for producing washes of lighter values.

A suitable acid spray solution for converting the gray tone areas to yellow is as follows:

| | Parts by vol. |
|---|---|
| Water | 20 |
| Isopropanol | 74 |
| Lactic acid | 6 |

The yellow tone areas thus produced are restored to the original gray values by spraying with the following alkaline solution:

| | Parts by vol. |
|---|---|
| Water | 42 |
| Potassium hydroxide (10% solution) | 2 |
| Morpholine | 7 |
| Isopropanol | 6 |
| Methyl ethyl ketone | 43 |

EXAMPLE III

The following is an example of a substantially gray watercolor composition useful in the process of Example I, but differing in that the composition is acidic and the color change to yellow is accomplished with an alkaline spray:

| | Parts by wt. |
|---|---|
| Water | 100.00 |
| Acetic acid (glacial) | 0.07 |
| Leucophor PA | 2.00 |
| Rubine S (C.I. Acid Violet 19) | 0.40 |
| Soluble Blue 2B Ex. (C.I. Acid Blue 22) | 0.70 |
| Tartrazine (C.I. Acid Yellow 23) | 0.50 |

The Rubine S and Soluble Blue dyes of the above composition (both manufactured by National Aniline & Chemical Co. of New York) are not true pH indicators, but do change from their respective violet and blue colors in acid solution to colorless in alkaline solution. The Tartrazine dye (manufactured by Nyanza Color & Chemical Co. of New York) supplies the yellow color throughout the process.

The Leucophor PA used in the above composition is a proprietary stilbene derivative optical brightener dyestuff having the required ultraviolet absorption spectra (manufactured by Sandoz, Inc. New York).

The above composition is diluted for producing the lighter wash values by addition of appropriate amounts of the following composition:

| | Parts by wt. |
|---|---|
| Water | 100.00 |
| Acetic acid | 0.05 |
| Leucophor PA | 2.00 |

The gray areas of the drawing are converted to yellow with a spray solution composed of:

| | Parts by volume |
|---|---|
| Water | 42 |
| Potassium hydroxide (10% solution) | 2 |
| Morpholine | 7 |
| Isopropanol | 6 |
| Methyl ethyl ketone | 43 |

The yellow areas thus produced are restored to the original values with a spray solution composed of:

| | Parts by wt. |
|---|---|
| Water | 20 |
| Isopropanol | 74 |
| Lactic acid | 6 |

Gray washes, such as produced with the watercolor composition of Examples I, II and III, are preferred for use in the process of this invention. In the production of advertising illustrations, the illustrator should be able to foresee the approximate effect of the ultmiate reproduction which is usually printed in black ink and thus is a neutral gray in the dotted halftone areas. Further, gray drawings are more readily reproduced by conventional halftone photographic techniques, than are colored drawings. However, blue or other colored washes can be used in the process of the invention, Example IV below comprising a specific example thereof.

EXAMPLE IV

The process of Example I is followed as described above, except that the following composition is used for the tone or wash areas of the drawing:

| | Parts by wt. |
|---|---|
| Water | 100.00 |
| Leucophor PA | 2.00 |
| Dibasic sodium phosphate | 1.00 |
| Bromphenol Blue | 0.05 |

The above composition, when painted out on paper produces a blue convertible wash and the process of producing the combination line and halftone reproduction therefrom is otherwise the same as that of Example I, the blue wash being readily converted to yellow for production of the line negative as described above.

For the purposes of this invention, the choice of pH indicators is governed by several considerations.

A. The initial color of the indicator, at the time it is used by the artist, must be such as to produce a wash of low actinic value (nonphotographic with the widely used orthochromatic negative materials) if the indicator is used singly. If two or more indicators are combined, the initial color of each should be such as to produce a dark gray, sepia, or near neutral dark shade when the combination is painted out to produce convertible washes.

B. The initially applied color of the indicators should be stable in air.

C. The initial color of the indicator(s) should be stable in solution containing the alkali required to neutralize acidity in illustration boards and papers to which the solution is applied.

D. The indicator(s) should produce a colored solution which has good brushability for artists so that washes are as free as possible from brush streaks, mottling, etc.

E. The indicator(s) should be expeditiously convertible to a lighter color or value for the production of line negatives.

F. The indicator(s) in its converted state should produce a color sufficiently pale to permit the use of a fast-working (not deeply colored) filter for making the line negative on commonly used orthochromatic negative materials which usually have maximum sensitivity to yellow light.

G. The indicator(s) color-changing reaction should be reversible so that drawings may be bleached and restored several times for practical reuse of the drawings.

EXAMPLE V

While spraying is a convenient and expeditious method for applying acids and bases to change convertible washes, other conversion methods may be employed. For example, a metal plate heated to about 180° F., and covered with a preheated glass plate, offers a convenient mechanism for reacting pH indicators. Thus a drawing made with convertible washes as disclosed in Example I is dusted over its entire surface with a finely powdered citric acid and placed in contact with the hot glass plate. The hot plate vaporizes sufficient water from the illustration board or paper to dissolve a portion of the critic acid and react it with the indicators to bring about the change to the yellow color. Reconversion is accomplished by dusting the drawing with ammonium carbonate which decomposes at 180° F. to produce carbon dioxide and ammonia. The ammonia combines with vaporized water at the surface of the drawing and reacts with the indicators to restore their initial basic colors. The process is otherwise the same as that of Example I.

EXAMPLE VI

Another alternative to spraying the drawing directly is to cover it with a sheet of gas-permeable paper such as Potlatch Printcraft Parchment paper (an eight-pound bleached manifold parchment paper sold by R & W Paper Co., Longview, Wash.). The aforementioned basic and acidic spray solutions are applied to the overlaid paper rather than directly upon the drawing. The drawing, with paper overlay, is then placed on a hot plate at 180° F. and covered with a preheated glass plate. In this situation, the heat rapidly volatilizes hydrochloric acid (or morpholine), which then penetrates the parchment paper and combines with heat-vaporized water from the illustration board or paper, as well as from the parchment paper, to convert the pH indicators. By this mechanism, practically all of the water which reaches the convertible washes is in vapor form rather than liquid. Hence, this method greatly reduces the risk of spotting or feathering the water soluble convertible washes.

The color-changeable watercolor of this invention is not limited to the use of pH indicators, and includes the use of substances which change color when oxidized or reduced. It is preferable that the artist apply such compounds in oxidized or unreduced condition so that the initial color or colors will not be changed by reaction with atmospheric oxygen. After production of the halftone negative, the tone areas of the drawing are then "bleached" or lightened in color by reaching the convertible washes with a reducing agent, then making the line negative, and subsequently restoring the washes to initial color by reaction with an oxidizing agent.

For example, a reduction-oxidation color-changeable watercolor may be formulated as follows:

EXAMPLE VII

| | Parts by wt. |
|---|---|
| Water | 100.00 |
| Hydrazine monohydrobromide | 4.0 |
| Wool yellow, Ex. Conc. (National Analine Division, Allied Chemical Corporation, New York. Color Index, Acid Yellow 23) | 1.2 |

EXAMPLE VII—Continued

| | Parts by wt. |
|---|---|
| Acid Magenta O (General Dyestuff Corporation, New York, Color Index, Acid Violet 19) | 0.5 |
| Ink blue G (American Cyanamid Co., Bound Brook, N.Y., Color Index, Acid Blue 22) | 0.6 |

The magenta and blue dyes are readily reducible to the colorless leuco form of each. The yellow dye is not reducible but combines with the magenta and blue dyes to produce a neutral or near neutral color in initially applied convertible washes. The hydrazine monohydrobromide, being slightly hygroscopic, holds sufficient water in the washes to expedite reduction and reoxidation. Ultraviolet light absorption results from the relatively high content of yellow dye in the undiluted watercolor. To produce washes that are lighter in value, the above mixture is thinned with a 2% water solution of Leucophor PA or other ultraviolet absorber. This solution should be acidified to a pH of approximately 6.0, with acetic acid or the like in order to maintain full color in the reducible dyes which become lighter in color at a pH greater than 6.0.

Suitable reducing and reoxidizing spray solutions are formulated as follows:

Reducing spray

| | Parts by vol. |
|---|---|
| Toluol | 47.0 |
| Isopropanol | 48.0 |
| Hydrazine hydrate | 1.0 |
| Water | 4.0 |

Oxidizing spray

| | |
|---|---|
| Toluol | 47.0 |
| Isopropanol | 48.0 |
| Lactic acid | 2.0 |
| Water | 4.0 |

Hydrazine hydrate in the bleaching spray reduces the magenta and blue dyes to a colorless leuco form, leaving only the yellow dye in wash-tones. The bleaching spray has no material effect upon black ink lines or areas. A line negative is made from the bleached drawing in the same manner as that described for drawings rendered with pH indicators.

In the restoring spray, lactic acid behaves as an oxidizing agent for the hydrazine-reduced leuco dyes, restoring them to their original colors and depth values.

In both sprays, the water is present to expedite reducing and oxidizing reactions. The combination of isopropanol and toluol, as a poor solvent for the dyes, depresses undesirable spotting or feathering of the dye washes, and also reduces surface-tension of the mixture so that the spray approaches fog-like consistency. Isopropanol permits the addition of 4% water to both mixtures without loss of homogeneity.

A further modification of the process of the present invention comprises the use of a watercolor composition wherein the dye or dye mixture produces a wash which is gray, near gray or otherwise colored, but which is capable of color change to a colorless condition so that the line negative can be made without any filter whatsoever. Thus, by way of example, in either the composition of Example III or of Example VII, the yellow dye (Tartrazine and Wool yellow, respectively), can be omitted entirely, and the wash tones produced thereby will, upon application of the first spray, convert to such a colorless condition.

In carrying out the invention the concentration ranges of all dyes and indicators used for gray (or essentially gray) tone washes, are limited by the "neutrality" of the grays they produce. That is, a shortage or excess of any one of the primary (blue, red, or yellow) colors will produce off-neutral grays which may thus become brownish or greenish, etc. Concentration ranges are further limited by deviation from pure yellow in bleached tones. For example, an excess of Eosin in Example I makes the bleached color reddish-yellow whch cannot be filtered to produce good density in corresponding areas of line negatives with the almost universally used orthochromatic films. All concentration ranges of dyes or indicators, used singly or in combination, are limited by (1) the concentration required to produce an initial photometric value (when brushed out on a drawing) of about 80% "black" or darker; and (2) the concentration required to produce a "bleached" photometric value of about 20% "black" or lighter. Those skilled in the art will understand that it is not possible to assign definite numerical values for ranges of suitable proportions applicable to the various dyes and indicators and combinations thereof, and that it is well within the skill of the art to determine the necessary proportions, given the present disclosure.

The foregoing description explains the uses made by this invention of color-changeable materials and the means for utilizing those changes to expedite the production of line negatives for double-printing or making line and halftone combination printing plates. Color changes resulting from alterations in the pH of hydrogen-ion indicators, as well as color changes by oxidation and reduction, have been described in detail. Other color-change mechanisms, merely for altering intensity or hue of tone values in a drawing, are considered as within the scope of this invention. Such mechanisms as nonacid to acid ion change; liberation of elements; changes in valence or solvation; photochemical changes; and metathetical reactions, etc., can be adapted to the method herein disclosed.

Having fully described my invention, it is to be understood that I do not wish to be limited to the details set forth, but my invention is of the full scope of the appended claims.

I claim:

1. A method for producing combination line and halftone reproductions of an illustration with unscreened lines through screened halftone areas, comprising the steps of preparing an illustration composed of lines and substantially gray tone areas with lines extending through said tone areas, said lines being rendered with conventional artists' media having noncolor changing characteristics, said tone areas being rendered with a medium containing a colored constituent which is capable of being treated to change the color of said tone areas, photographically producing a halftone negative of the illustration so prepared, contacting the illustration with a material capable of changing the color of the tone areas to change the color of said tone areas to a substantially yellow color of given spectral characteristics, photographically producing a line negative of said illustration with substantially yellow light having spectral characteristics substantially the same as those of said given spectral characteristics, and double-printing said negatives.

2. The method of claim 1, wherein said colored constituent is a pH indicator.

3. The method of claim 1, wherein said colored constituent is a reducible dye.

4. The method of claim 1, wherein the medium for said tone areas comprises an alkaline solution containing a pH indicator to provide said colored constituent.

5. The method of claim 4, wherein the color of the tone areas is changed by applying an acid thereto.

6. The method of claim 3, wherein the color of the tone areas is changed by applying a reducing agent thereto.

7. The method of claim 4, wherein the color of the tone areas is changed by spraying an acid solution thereover.

8. The method of claim 1, wherein said illustration is treated to restore the original color of said tone areas following production of said line negative.

9. The method of claim 5, wherein said illustration is treated to restore the original color of said tone areas by applying an alkaline solution thereto following production of said line negative.

10. The method of claim 6, wherein said illustration is treated to restore the original color of said tone areas by applying an oxidizing agent thereto following production of said line negative.

11. The method of claim 1 wherein the medium for said tone areas comprises an alkaline solution containing bromophenol blue, Eosin red and a yellow dye, the relative amounts and proportions of said indicators and said yellow dye being sufficient to produce substantially gray areas when said composition is applied to the illustration.

12. The method of claim 1 wherein said line negative is photographically produced by photographing said drawing on a light-sensitive element through a filter of the same color as the substantially yellow color to which the tone areas have been changed, developing said element to produce a line negative, and double-printing said negatives.

References Cited

UNITED STATES PATENTS

| | | | |
|---|---|---|---|
| 2,276,718 | 3/1942 | Crosby | 96—45 XR |
| 2,319,079 | 5/1943 | Murray et al. | 96—45 XR |
| 2,391,025 | 12/1945 | Marx | 96—45 |
| 2,687,949 | 8/1954 | Marx | 96—45 XR |

NORMAN G. TORCHIN, *Primary Examiner.*

RONALD H. SMITH, *Assistant Examiner.*

U.S. Cl. X.R.

96—43, 45; 252—408